United States Patent
Satoh et al.

(10) Patent No.: US 7,325,147 B2
(45) Date of Patent: Jan. 29, 2008

(54) PERSONAL COMPUTER OPERATION ENVIRONMENT PRESETTING SYSTEM AND METHOD BASED ON DETECTING AN INPUT AC POWER SOURCE VOLTAGE ON THE PERSONAL COMPUTER WHEN A WIRELESS LAN CARD IS MOUNTED THEREIN

(75) Inventors: Harumi Satoh, Kawasaki (JP); Yoshikazu Kobayashi, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 322 days.

(21) Appl. No.: 10/695,982

(22) Filed: Oct. 30, 2003

(65) Prior Publication Data

US 2004/0088388 A1  May 6, 2004

(30) Foreign Application Priority Data

Dec. 2, 2002 (JP) ............... 2002-349498

(51) Int. Cl.
 *G06F 1/00* (2006.01)
 *G06F 11/30* (2006.01)
 *H04Q 7/20* (2006.01)
(52) U.S. Cl. .............. 713/300; 713/340; 455/434
(58) Field of Classification Search ........ 713/300, 713/340; 379/394; 375/222; 455/434
 See application file for complete search history.

(56) References Cited

U.S. PATENT DOCUMENTS 5,506,868 A * 4/1996 Cox et al. ............... 375/222
6,396,922 B1 * 5/2002 Khuat ..................... 379/394
6,484,029 B2 * 11/2002 Hughes et al. ........... 455/434
6,611,580 B1 * 8/2003 Dahan et al. ............ 379/93.29
2002/0048033 A1  4/2002 Tsukamoto et al.

FOREIGN PATENT DOCUMENTS

| JP | 5-219280 A | | 8/1993 |
| JP | 05219280 A | * | 8/1993 |
| JP | 6-125246 A | | 5/1994 |
| JP | 07023129 A | * | 1/1995 |
| JP | 9-297191 A | | 11/1997 |
| JP | 2000-47855 A | | 2/2000 |
| JP | 2001136538 A | * | 5/2001 |
| JP | 2002-159043 A | | 5/2002 |
| JP | 2002-197415 A | | 7/2002 |
| WO | WO 01/30025 A1 | | 4/2001 |
| WO | WO 01/61441 A1 | | 8/2001 |

* cited by examiner

*Primary Examiner*—Suresh K Suryawanshi
(74) *Attorney, Agent, or Firm*—Sughrue Mion, PLLC

(57) ABSTRACT

An input power source voltage detecting unit 1 detects the input AC power source voltage on an electronic device, and a country discriminating unit 2 discriminates the country with the electronic device present therein according to the detected voltage. An operation environment presetting unit 5 presets the electronic device to operation environments of the country discriminated by the country discriminating unit 2.

5 Claims, 4 Drawing Sheets

FIG.4

PERMISSIBLE WIRELESS FREQUENCY CHANNELS IN COUNTRIES
(IEEE802. 11)

JAPAN:CH1~14
U.S.A.(FCC):CH1~11
CANADA(IC):CH1~11
FRANCE:CH10~13
EUROPE(ETSI):CH1~13
SPAIN:CH10、11
ETC

PERMISSIBLE TRANSMISSION POWER LEBELS IN COUNTRIES
(IEEE802. 11)

JAPAN:10mW/MHz
U.S.A.(FCC):1000mW
EUROPE:100mW
ETC

PERSONAL COMPUTER OPERATION
ENVIRONMENT PRESETTING SYSTEM
AND METHOD BASED ON DETECTING AN
INPUT AC POWER SOURCE VOLTAGE ON
THE PERSONAL COMPUTER WHEN A
WIRELESS LAN CARD IS MOUNTED
THEREIN

BACKGROUND OF THE INVENTION

This application claims benefit of Japanese Patent Application No. 2002-349498 filed on Dec. 2, 2002, the contents of which are incorporated by the reference.

The present invention relates to electronic device operation environment presetting system and method and, more particularly, to electronic device operation environment presetting system and method capable of presetting of operation environments of a wireless LAN station such as frequency channel and transmission power level, for instance, to be adaptive to specifications prescribed by standard organizations in various countries.

With recent trend for global scale traffic and business, communication means capable of data transmission not only locally but also globally have been become necessary. For realizing this, wired communication means such as internet have been proposed and widely utilized together with personal computers connected thereto. However, the utilization of such wired communication means is limited to particular places providing connection ports, and also installation and maintenance of such means require considerable expenditures. On the other hand, wireless communication means permit service area expansion, and also require relative inexpensive installation and maintenance expenditures. Thus, wireless LAN systems have been proposed.

Wireless communication, however, are under different superintendent managements in different countries or regions or by different superintendent agencies, and has not been globally standardized. Therefore, when a user intends to do data communication or the like by connecting a personal computer or the like to the wireless LAN system, it is necessary to adopt a system or mode (or country mode), which conforms to the wireless communication system in each country or region. However, with development of traffic means and global business trend, there are increasing cases, in which users using personal computers or the like frequently move from one country or region to a different country or region.

For using a personal computer or the like in interconnection to wireless LAN, it has been necessary to use those which are preset for particular country modes for respective countries or regions. For using the personal computer in other countries or regions, it has been necessary to prepare separate personal computers or the like, which conforms to individual countries or regions.

Alternatively, it has been necessary to change particular software and substitute a module for part of hardware. In either case, the user has encountered inconvenience in use.

This is also applied to systems in which wireless LAN cards are mounted as interface of wireless LAN system in personal computers.

Specifically, in the case of wireless LAN card, permissible wireless channels (frequency) and maximum permissible transmission power level are different with countries. For example, in the U.S.A. specifications, the permissible wireless channels for the wireless LAN card are CH1 to CH11, and the maximum permissible signal power level is 1,000 mW. In the Japanese specifications, on the other hand, the permissible wireless channels are CH1 to CH14, and the maximum permissible signal power level is 10 mW/Mz.

Heretofore, therefore, when utilizing the personal computer by going from Japan to U.S.A, it has been necessary to mount a purchased or rental wireless LAN card conforming to the U.S.A. specifications in the own personal computer. This poses cost and operability problems.

As shown, when moving country to country in foreign country business trip or journey, whenever the user goes to a different country, it becomes necessary to change or replace operation environments of the personal computer or wireless LAN cardin order to conform to the specifications of that country. This causes only complicated operations, but also possibility of disability of utilizing the carried personal computer on the wireless LAN system in case when the wireless LAN card conforming to the specifications of the new country entered is not obtained.

Furthermore, it is necessary to note and use wireless channels which can not be used by the user. This means that wireless field knowledge is necessary, thus giving rise to problems in view of the operability.

The above problems are encountered not only with personal computers but also with other electronic devices, typically video tape recorders (VTR). In such electronic devices, usually various controls are made on the basis of time instant data obtained by an internal clock function. Accordingly, an automatic correcting system has been proposed, in which a global positioning system receives waves transmitted from an artificial satellite to obtain coordinates at the measurement point and automatically executing time difference correction and specified environment change in correspondence to the pertinent region (see, for instance, Literature 1: Japanese patent laid-open Hei 9-297191). Also, one or more radio and other broadcast stations are present in individual stations, and the frequency channels of these broadcast stations are usually different from one another. This means inconvenience is felt by the user moving in a car, in which a channel presetting type receiver is mounted, that he or she has to change the receiver presetting whenever he or she moves from one region to another. Accordingly, an automatic channel presetting wireless receiver has also been proposed, which includes a region code detecting means and automatically presets its reception channel in correspondence to the region with the user present therein (see, for instance, Literature 2: Japanese patent laid-open Hei 6-125246).

As shown above, with the prior art electronic device operation environment presetting system, in order to utilize an electronic device in a plurality of countries or regions with different specifications and operation environments, it is necessary to independently preset the specifications and operation environments conforming to these countries or regions, thus posing various problems in view of operability and cost.

SUMMARY OF THE INVENTION

An object of the present invention is to provide an electronic device operation environment presetting system and method capable of presetting operation environments conforming to use in countries or regions so long as the countries or regions are predetermined countries or regions.

Another object of the present invention is to provide electronic device operation environment presetting system and method capable of automat presetting operation environments conforming to use in countries or regions so long as the countries or regions are predetermined countries or regions.

A further object of the present invention is to provide an electronic device operation environment presetting system and method, which permit presetting operation environments of wireless LAN card conforming to use in countries or regions so long as the countries or regions are predetermined countries or regions.

According to an aspect of the present invention, there is provided an electronic device operation environment presetting system comprising: an input power source voltage detecting unit for detecting an input AC power source voltage on an electronic device; a country discriminating unit for discriminating the country with the electronic device present therein according to the voltage detected by the input power source voltage detecting unit; and an operation environment presetting unit for presetting the electronic device to operation environments of the country discriminated by the country discriminating unit.

According to another aspect of the present invention, there is provided an electronic device operation environment presetting system comprising: an input power source voltage detecting unit operable, when a wireless LAN card is mounted therein, to detect an electronic device input AC power source voltage permitting operation in a wireless LAN system; a country discriminating unit for discriminating the country with the electronic device present therein on the basis of the voltage detected by the input power source voltage detecting unit; and an operation environment presetting unit for presetting the wireless LAN card to operation environments of the country discriminated by the country discriminating unit.

The electronic device operation environment presetting system further comprises an individual country power source voltage list, in which commercial power source voltage values in predetermined countries are stored, and which is referred to by the country discriminating unit for discriminating a country of an identical power source voltage with the voltage detected by the input power source voltage detecting unit. The electronic device operation environment presetting system further comprises an individual country operation environment list, in which operation environments preset for predetermined countries are stored, and which is referred to by the operation environment presetting unit for presetting the electronic device to the operation environments of the discriminated country. The input power source detecting unit executes the detection by utilizing an AC voltage detecting function of an AC-DC adapter for converting AC voltage to DC voltage used in the electronic device.

According to other aspect of the present invention, there is provided an electronic device operation environment presetting system for presetting operation environments of electronic devices furnished with DC power from a battery, comprising: a country designating unit for designating a predetermined country in a predetermined country list; and an operation environment presetting unit for presetting the electronic device to operation environments of the designated country.

The electronic device operation environment presetting system further comprises an individual country operation environment list, in which operation environments preset for predetermined countries are stored, and which is referred to by the operation environment presetting unit for presetting the electronic device to operation environments of the designated country. The electronic device is a personal computer.

According to further aspect of the present invention, there is provided an electronic device operation environment presetting method comprising: a step of detecting the input AC power source voltage on an electronic device; a step of discriminating a country with the electronic device present therein according to the detected voltage; and a step of presetting the electronic device to operation environments of the discriminated country.

Other objects and features will be clarified from the following description with reference to attached drawings.

BRIEF DESCRIPTION OF THE DRAWINGS

FIG. 4 shows an example of countries of permissible wireless channels prescribed in IEEE 802.11.

PREFERRED EMBODIMENTS OF THE INVENTION

Preferred embodiments of the present invention will now be described with reference to the drawings.

Figure 1:
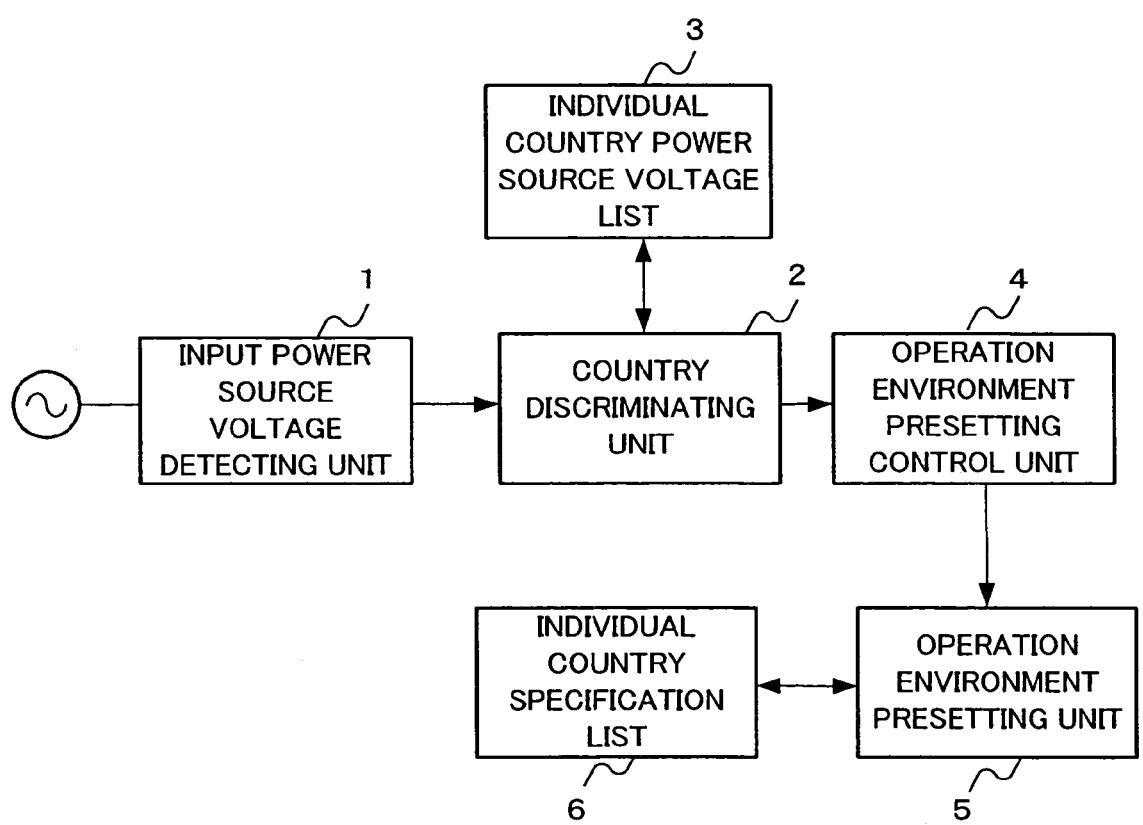
FIG. 1 is a block diagram showing a first embodiment of the electronic device operation environment presetting system and method according to the present invention.

FIG. 1 is a block diagram showing a first embodiment of the electronic device operation environment presetting system and method according to the present invention. The present invention is applicable to general electronic devices and is also applicable not only to countries but also to regions of environments alike. In the following embodiments, personal computers are taken as an example, and also countries are taken as the subject of example.

Referring to FIG. 1, an input power source voltage detecting unit 1 detects the voltage of an AC power source (i.e., commercial power source) used in the present or prevailing country (or region). A country discriminating unit 2 discriminates the country on the basis of the voltage detected in the input power source voltage detecting unit 1. Specifically, commercial power source voltage values in predetermined countries are stored as individual country power source voltage list 3 in a memory, and the country discriminating unit 2 compares the voltage detected in the input power source voltage detecting unit 1 with voltage values stored in the individual country power source voltage list 3, and discriminates a country with the identical preset voltage value as the pertinent country. For instance, the country discriminating unit 2 discriminates the country to be Japan when the power source voltage is 100 V and U.S.A. when the power source voltage is 120 V.

The discriminated country data is sent out to an operation environment presetting control unit 4. The operation environment presetting control unit 4 outputs a control signal for presetting the personal computer to the discriminated operation environments (or specifications). An operation environment (or specification) presetting unit 5 receives the control signal, and presets the personal computer to the operation environments of the specifications of the discriminated country. For this presetting, a predetermined individual country specification (or operation environment) list 6 is stored in a memory, and the operation environments (or specifications) of the country discriminated on the basis of an instruction signal from the operation environment (or specification) presetting unit 5 are read out from the individual country specification (or operation environment) list 6 and preset.

Figure 2:
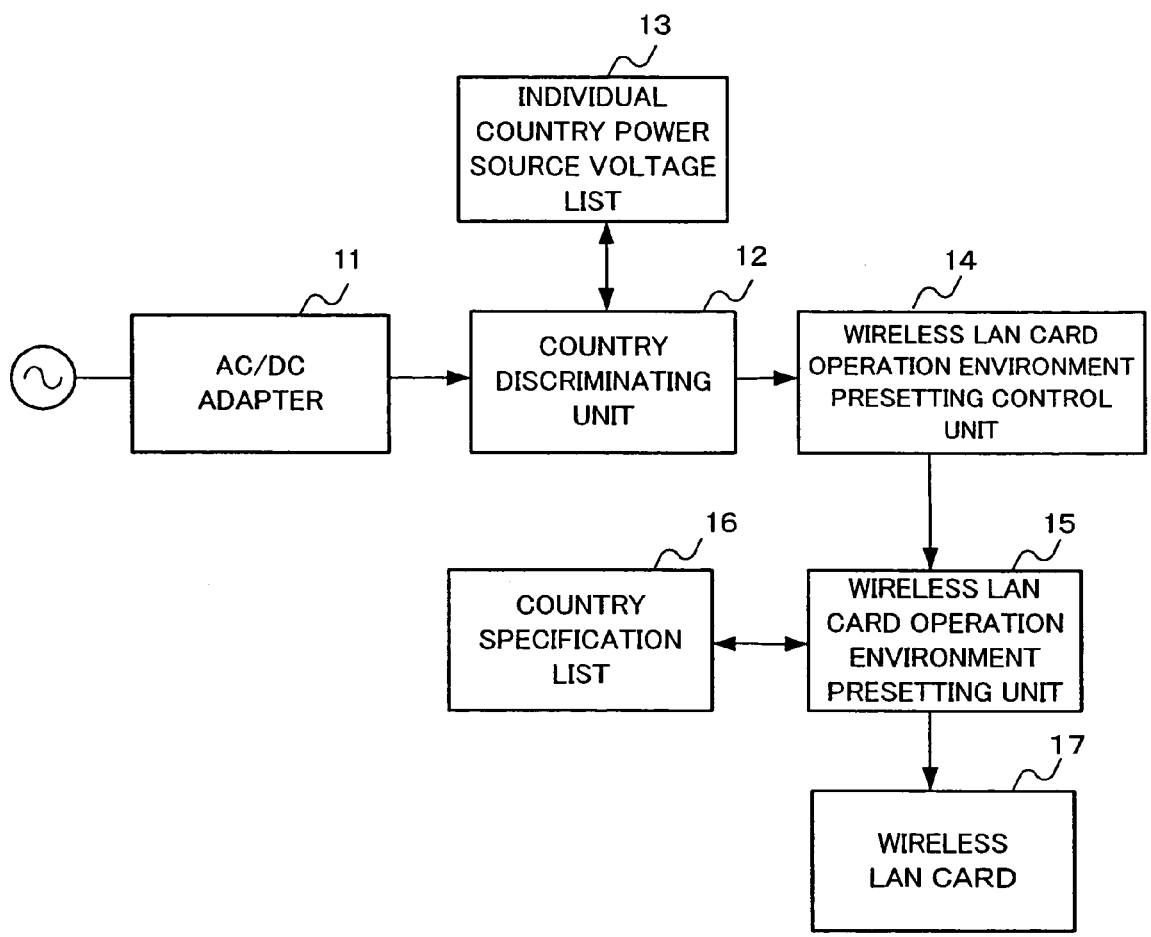
FIG. 2 is a block diagram showing a second embodiment of the electronic device operation environment presetting system and method on the basis of the present invention.

FIG. 2 is a block diagram showing a second embodiment of the electronic device operation environment presetting system and method on the basis of the present invention, and shows an arrangement in the case of utilizing a personal computer with a wireless LAN card under wireless LAN system environments.

Referring to FIG. 2, while this embodiment, like the embodiment shown in FIG. 1, detects the voltage of the AC power source (i.e., commercial power source) used in the present or prevailing country, the detection is made by utilizing an AC voltage detecting function of an AC-DC adapter 11 for converting AC voltage to DC voltage used in the personal computer. A country discriminating unit 12 discriminates a country according to the voltage detected in the AC-DC adapter 11. Like the above case, commercial power source voltage values in predetermined countries are stored as an individual country power source voltage list 13 in a memory.

A country discriminating part 12 compares the voltage detected in the AC-DC adapter 11 with the voltages in the individual country power source voltage list 13, and discriminates a country with the identical preset voltage value as the pertinent country. The discriminated country data thus obtained is sent out to a wireless LAN card operation environment presetting control unit 14. The wireless LAN card operation environment presetting control part 14 outputs a control signal for presetting the personal computer to the operation environments (or specifications) corresponding to the discriminated country.

A wireless LAN card operation environment (or specification) presetting unit 15 receives the control signal, and presets the operation environments (or specifications) of a wireless LAN card 17 to the operation environments of the specifications of the discriminated country. For the presetting, a predetermined country specification (or operation environment) list 16 is stored in a memory, and the operation environments (or specifications) corresponding to the country discriminated on the basis of an instruction signal from the wireless LAN card operation environment (or specification) presetting unit 15, are readout from the individual country specification (or operation environment list 16 and preset.

Figure 3:
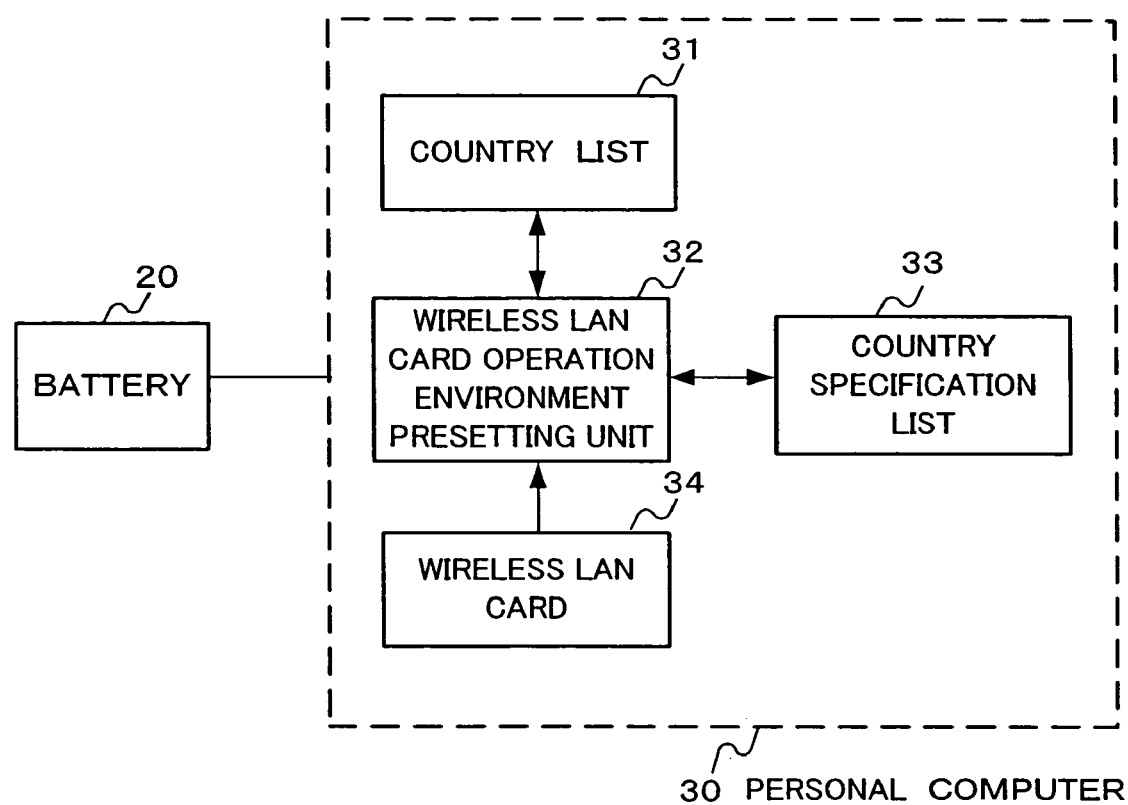
FIG. 3 is a block diagram showing a third embodiment of the electronic device operation environment presetting system and method according to the present invention.

FIG. 3 is a block diagram showing a third embodiment of the electronic device operation environment presetting system and method according to the present invention, and shows an arrangement in the case of having resort to a battery for utilizing the personal computer with the wireless LAN card under the wireless LAN system environments.

In the previous embodiments the country discrimination was made on the basis of the AC power source voltage value. These embodiments, however, are not applicable to the case of using a battery without using any AC power source. In this embodiment, in the case of utilizing a battery-driven personal computer or like electronic device as well, it is possible to preset operation environments conforming to the specifications (or operation environments) of the pertinent country (or region).

Referring to FIG. 3, a personal computer 30 is connected to a battery 20 and furnished with DC power therefrom. In the personal computer 30 a predetermined country list 31 is prepared (i.e., stored in a memory), and the prevailing country, in which the user is present, is selected with reference to the predetermined country list 31. Also, in the personal computer 30, like the FIG. 2 arrangement, a wireless LAN card operation environment (or specification) presetting unit 32 and predetermined country specification (operation environment) list (stored in a memory) 33 are provided. The wireless LAN card operation environment (or specification) presetting unit 32 presets the operation environments (or specifications) of the wireless LAN card 34 to the operation environments of the specifications of the country selected by the user.

The data of the individual country (or region) specifications (or operation environments) may be a frequency hopping number system (i.e., FH system) and the like as well as the above permissible wireless channels and maximum permissible transmission power level. FIG. 4 shows an example of countries of permissible wireless channels prescribed in IEEE 802.11, i.e., Japan, U.S.A., Canada, France, Europe and Spain, and an example of countries of permissible transmission power levels of the same prescription, i.e., Japan, U.S.A. and Europe.

As has been shown, it will be seen that with the electronic device operation environment presetting system and method according to the present invention, it is possible, even in the case when the user brings the own carried electronic device (i.e., personal computer) to foreign countries in a business trip or the like, that the user preset the operation environments conforming to the specification of a pertinent country without need of any particular operation. Also, in the case of a battery-driven electronic device, easy presetting of the operation environments conforming to the specifications of a pertinent foreign country may be made by user's country (or region) designation.

As has been described in the foregoing, with the electronic device operation environment presetting system and method according to the present invention, it is possible to obtain an electronic device operation environment presetting system, which permits automatic presetting of the operation environments conforming to the use in foreign countries or regions. Thus, wherever in the world where the user intends to use a personal computer or the like, it is possible to connect readily and quickly the personal computer or the like to wireless LAN system on the basis of the specifications on the site for use.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A personal computer operation environment presetting system comprising:

a power source voltage list for storing AC power source voltages for each of specified countries;

an input power source voltage detecting unit operable, when a wireless LAN card is mounted therein, to detect the personal computer input AC power source voltage permitting operation in a wireless LAN system;

a country discriminating unit for discriminating the country with the personal computer present therein on the basis of the voltage detected by the input power source voltage detecting unit; and an operation environment presetting unit for presetting the operation environment of the wireless LAN card to the operation environment of the country discriminated by referring to an operation environment list.

2. The personal computer operation environment presetting system according to claim 1, wherein the operation environment list, stores operation environments preset for specified countries.

3. The personal computer operation environment presetting system according to claim 1, wherein the input power source detecting unit executes the detection by utilizing an AC voltage detecting function of an AC-DC adapter for converting AC voltage to DC voltage used in the electronic device.

4. A personal computer operation environment presetting method comprising:

storing AC power source voltage for each of specified countries in a power source voltage list;

detecting an input AC power source voltage on the personal computer when a wireless LAN card is mounted therein;

discriminating a country with the personal computer present therein according to the detected input AC power source voltage; and presetting an operation environment of the wireless LAN card to an operation environment of the discriminated country by referring to an operation environment list.

5. The personal computer operation environment presetting system of claim 1 wherein the country discriminating unit discriminates the country with the personal computer present therein according to only the input power source voltage detected.

* * * * *